United States Patent Office 2,962,841
Patented Dec. 6, 1960

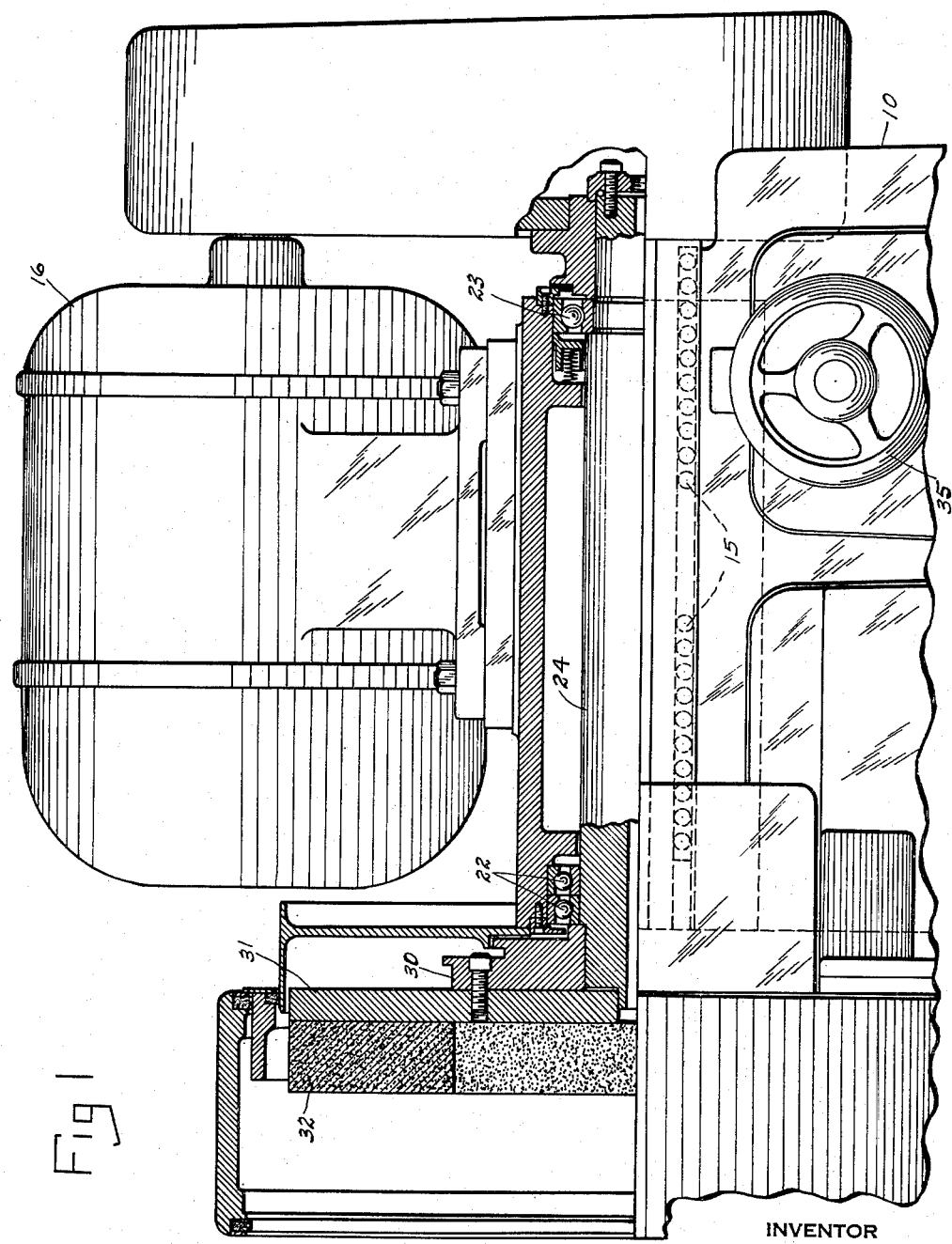

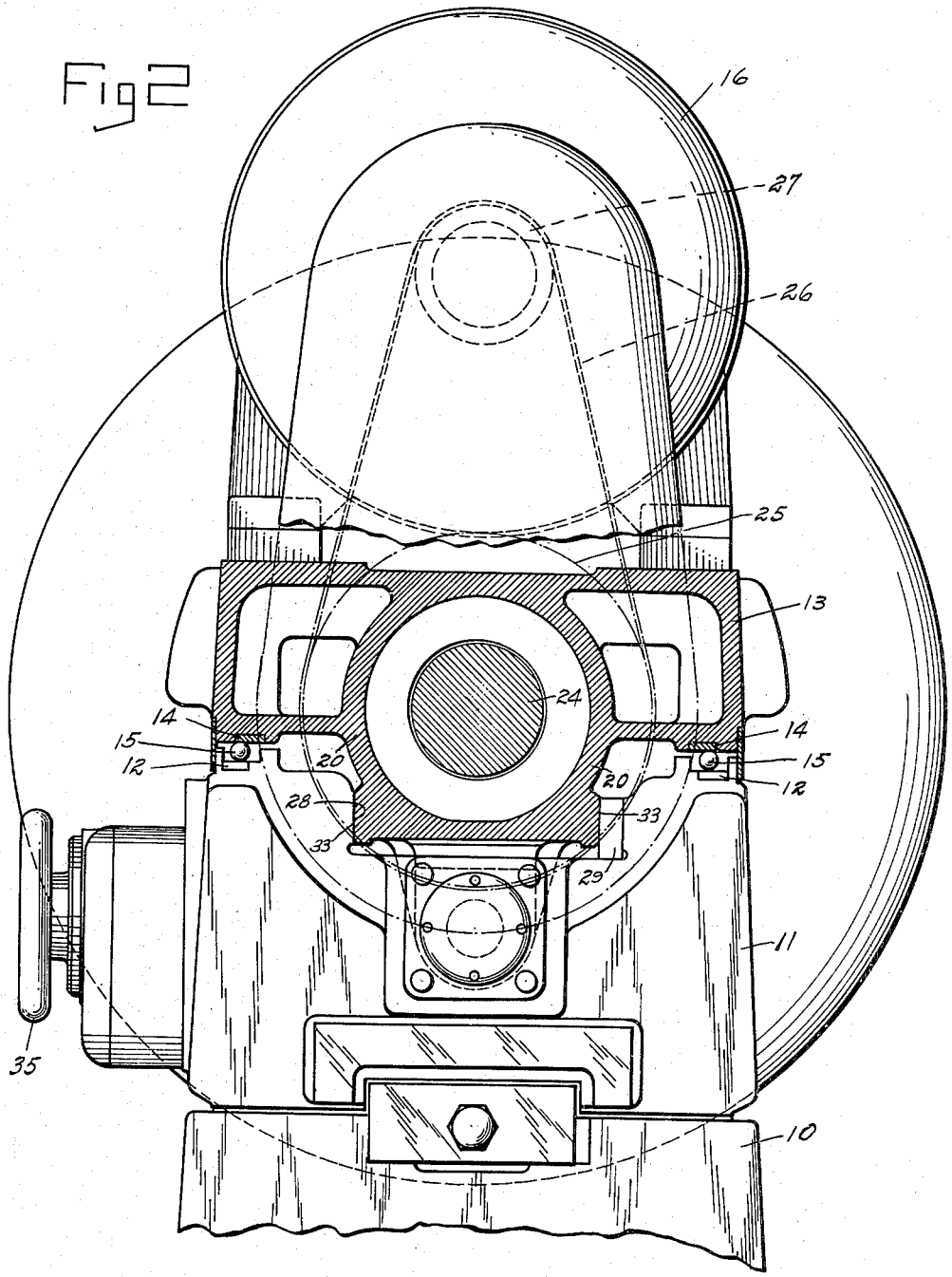

2,962,841
SPINDLE MOUNTING

Ralph E. Price, Beloit, Wis., assignor to Gardner Machine Company, Beloit, Wis.

Filed Sept. 28, 1956, Ser. No. 612,793

6 Claims. (Cl. 51—109)

This invention relates to grinding machines, particularly to surface grinders of the type known as double spindle disc grinders, and more particularly to the relation between the various supporting elements of the spindle mounting as it affects the stability of the mounting.

In previous machines of this type, the relative positions of the bearing members and spindle axis have followed a more or less common pattern. The bearing members are spaced closely together and the axis of the wheel spindle is positioned above the bearing surfaces a distance equal to or greater than the space between the bearing surfaces. With this arrangement, most of the forces resulting from the grinding action are applied to the spindle housing; that is, the portion of the machine above the slide with only a relatively small percentage of the forces being taken by the slide. These forces tend to tilt the spindle housing on the slide. In order to improve the stability of the wheel mounting, it is desirable that most of the grinding force be applied to the slide member. This may be accomplished by lowering the spindle axis to a point as close as possible to the plane of the bearing surfaces on the slide member and at the same time increasing the space between said bearing surfaces. The ideal condition is where the axis of the spindle lies in the plane of the bearing surfaces.

It is an object of this invention to provide in a machine of this type, a substantial improvement in the stability of the spindle mounting.

Another object is to provide a spindle mounting in which the vertical distance between the axis of the spindle and the bearing surfaces of the spindle housing is held to a minimum.

Another object is to provide a spindle mounting in which the vertical distance between the axis of the spindle and the bearing surfaces is less than the radius of the spindle.

Figure 1 is a partial front elevation of a disc grinder.

Figure 2 is a right hand end elevation showing the relative vertical positions of the spindle axis and guide surfaces.

Numeral 10 indicates the bed of a grinding machine of the type know as a horizontal spindle disc grinder. 11 is an intermediate slide member mounted for longitudinal adjustment on said bed. Parallel spaced bearing members 12 having hardened inserts are formed in the upper side of slide 11. A spindle housing or grinding wheel support 13 having bearing members 14 on the underside and having the same spacing as bearing members 12 on slide 11, is movably mounted on spaced rows of bearing balls 15 on bearing members 12. The upper portion of slide member 11 is recessed to receive a depending portion 20 of spindle housing 13. A spindle 24 is rotatably mounted in anti-friction bearings 22 and 23 in said depending portion of the spindle housing 13. This construction makes it possible to locate the spindle axis close to the plane of the bearing members 12 with the result that a substantial portion of the turning and twisting forces caused by the grinding action are directed between the bearing members and through the slide 11 instead of outside the bearing members and through the spindle housing 13 as was the case in previous machines.

Parallel vertical guide members 33 on the lower portion 20 of the spindle housing 13 co-act with guide member 28 in slide 11 on the one side of said portion 20 and with a gib 29 in said recess on the other side of said portion 20.

Spindle 24 is driven through a pulley 25 on one end of said spindle connected by a driving belt 26 through a pulley 27 to motor 16. Said motor is mounted on spindle housing 13. At the other end of spindle 24 is a flange portion 30 to which is attached a mounting plate 31 for a grinding disc 32.

Endwise movement of spindle housing 13 is effected by a hand wheel 35 through a conventional gearing arrangement (not shown).

I claim:

1. In a grinding machine, a bed, a slide on said bed, laterally spaced bearing members on said slide, said slide having a longitudinal recess in its upper portion between said bearing members, a spindle housing slidably mounted on said bearing members and having a depending portion extending into said slide recess, a spindle rotatably mounted in said depending portion, oppositely disposed guide members on said depending portion, and guide members on said slide co-acting with said guide members on said depending portion to prevent lateral movement of said spindle housing.

2. In a disc grinding machine, a bed, a slide on said bed, laterally spaced bearing members on said slide, said slide having a longitudinal recess in its upper portion between said bearing members, guide members in said recess, a spindle housing slidably mounted on said bearing members and having a depending portion extending into said recess, a spindle rotatably mounted in said depending portion, and guide members on said depending portion co-acting with said guide members in said recess.

3. In a grinding machine, a bed, a slide on said bed, laterally spaced bearing members on said slide, said slide having a longitudinal recess in its upper portion between said bearing members, a spindle housing slidably mounted on said bearing members and having a depending portion extending into said slide recess, a spindle rotatably mounted in said depending portion, and co-acting means on said depending portion and said slide to prevent lateral movement of said spindle housing.

4. In a grinding machine, a bed, a slide on said bed, laterally spaced bearing members on said slide, said slide having a longitudinal recess in its upper portion between said bearing members, a spindle housing having bearing members co-acting with said bearing members on said slide, said co-acting bearing members being spaced substantially in excess of the width of said spindle housing, said spindle housing having a depending portion extending through said recess, a spindle rotatably mounted in said depending portion in such relation to said bearing members that a substantial portion of said spindle is below the plane of said bearing members.

5. In a grinding machine, a bed, a slide on said bed, laterally spaced bearing members on said slide, said slide having a longitudinal recess in its upper portion between said bearing members, a spindle housing having bearing members co-acting with said bearing members on said slide, said spindle housing having a depending portion extending through said slide recess, said co-acting bearing members being spaced substantially in excess of the width of said depending portion, a spindle rotatably mounted in said depending portion in such relation to said bearing members that a substantial portion of said spindle is below the plane of said bearing members.

6. In a grinding machine, a bed, a slide on said bed, laterally spaced bearing members on said slide, said slide having a longitudinal recess in its upper portion between said bearing members, a spindle housing having bearing members co-acting with said bearing members on said slide, said co-acting bearing members being spaced a distance substantially twelve times the space between said bearing members and the axis of said spindle.

References Cited in the file of this patent
UNITED STATES PATENTS

| | | |
|---|---|---|
| 911,896 | Miller | Feb. 9, 1909 |
| 2,103,984 | Indge | Dec. 28, 1937 |
| 2,151,655 | Flygare | Mar. 21, 1939 |
| 2,424,448 | Gardner et al. | July 22, 1947 |